United States Patent [19]

Shinohara

[11] Patent Number: 4,575,307

[45] Date of Patent: Mar. 11, 1986

[54] GUIDE VANE OPERATING MECHANISM FOR HYDRAULIC MACHINE

[75] Inventor: Morimiti Shinohara, Hitachi, Japan

[73] Assignee: Hitachi, Ltd., Tokyo, Japan

[21] Appl. No.: 559,268

[22] Filed: Dec. 8, 1983

[30] Foreign Application Priority Data

Dec. 10, 1982 [JP] Japan .................. 57-215562

[51] Int. Cl.[4] ............................. F03B 3/18
[52] U.S. Cl. .................. 415/150; 415/164; 415/165
[58] Field of Search ............. 415/150, 159, 160, 163, 415/164, 165, 151, 500; 74/105

[56] References Cited

U.S. PATENT DOCUMENTS

| 1,706,372 | 3/1929 | Anderson | 415/150 |
| 1,725,421 | 8/1929 | Rogers | 415/150 X |
| 2,746,713 | 5/1956 | Peyrin et al. | 415/150 X |
| 2,904,307 | 9/1959 | Balje et al. | 415/164 |
| 3,236,498 | 2/1966 | Kerensky | 415/164 X |
| 3,251,539 | 5/1966 | Wolfe et al. | 415/150 |
| 3,452,961 | 7/1969 | Forsman | 74/105 |
| 3,533,709 | 10/1970 | Willi | 415/500 X |
| 3,901,624 | 8/1975 | Mayo, Jr. et al. | 415/150 |
| 4,210,408 | 7/1980 | Nace | 415/160 |
| 4,403,913 | 9/1983 | Fisker | 415/150 |

FOREIGN PATENT DOCUMENTS

| 215376 | 5/1961 | Austria | 415/150 |
| 474667 | 6/1951 | Canada | 415/150 |
| 37779 | 8/1923 | Norway | 415/150 |

Primary Examiner—Everette A. Powell, Jr.
Attorney, Agent, or Firm—Antonelli, Terry & Wands

[57] ABSTRACT

A guide vane operating mechanism for a hydraulic machine including a main shaft carrying a runner and guide vanes for varying the angle of attack of water to the runner. A guide ring is rotatably arranged around the main shaft, with a guide vane driving mechanism being provided for a linkage between the main shaft and the guide vanes so as to drive the guide vanes between fully-open and fully-closed positions. At least one servomotor has a reciprocating actuating rod, with a guide ring actuating mechanism for transmitting the driving power to the guide ring to cause a rotation of the latter. The guide ring actuating mechanism includes means connects the actuating rod to the guide ring in such a manner so as to permit the actuating rod and the guide ring to make a cranking motion relative to each other.

1 Claim, 12 Drawing Figures

FIG. 2a
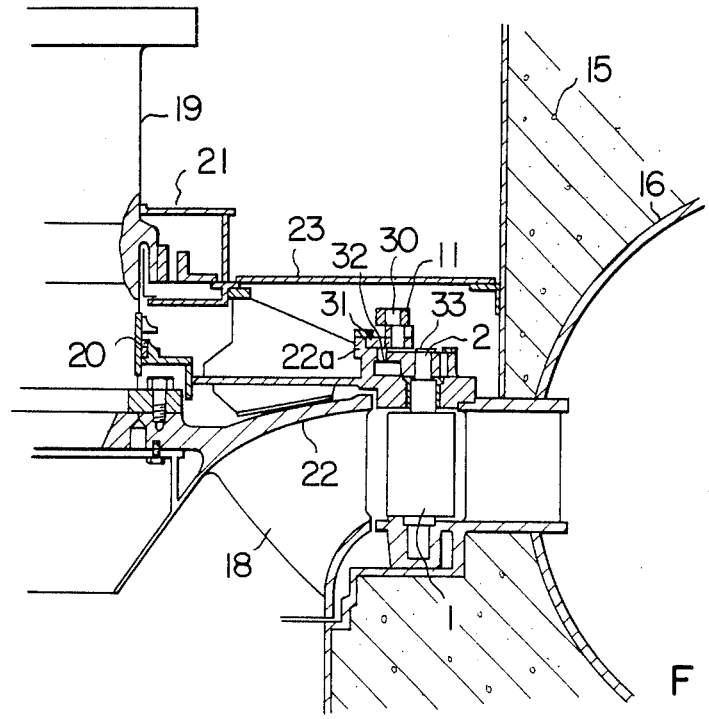
FIG. 2b
FIG. 2c
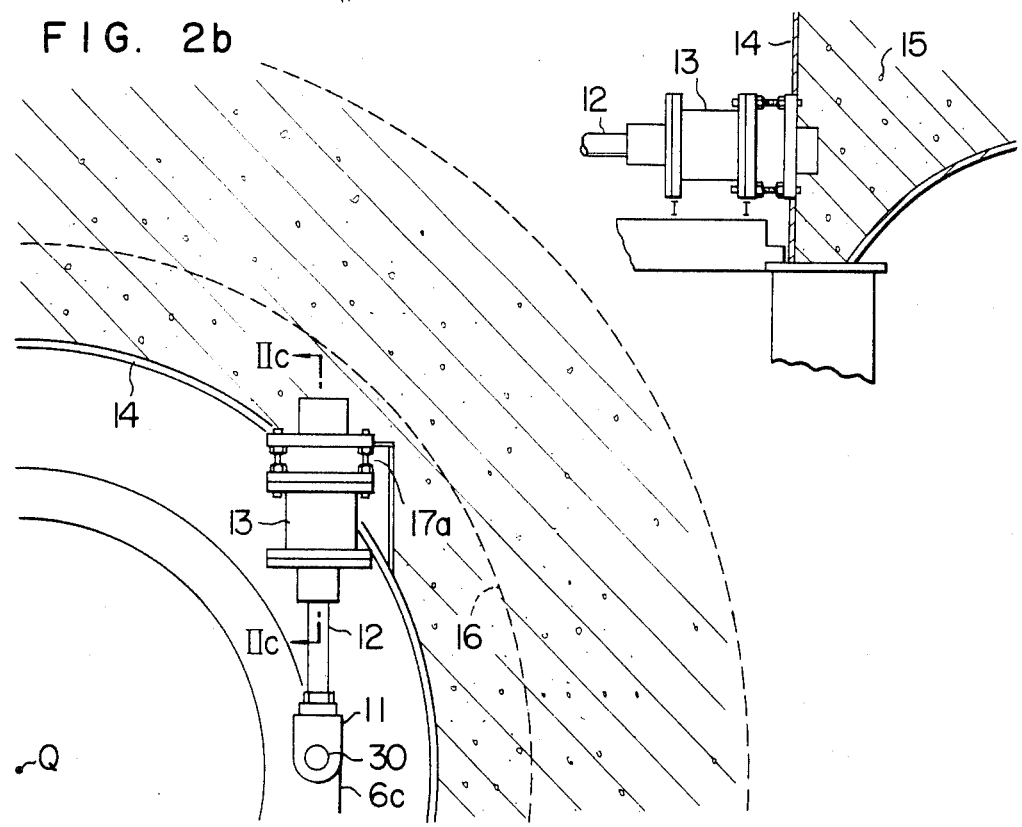

GUIDE VANE OPERATING MECHANISM FOR HYDRAULIC MACHINE

The present invention relates to a guide vane operating mechanism for hydraulic machines and, more particularly, to a guide vane operating mechanism having a guide ring adapted to be rotatably driven by a servomotor and a linking mechanism through which the guide ring is connected to the guide vanes of the hydraulic machine.

In a hydraulic machine such as, for example, a Francis turbine installed in a hydraulic power station, a plurality of guide vanes are arranged along the inner periphery of the volute casing of the turbine, with the guide vanes being adpated to change the angle at which the water is directed to the runner (referred to as "angle of attack", hereinunder) of the turbine to thereby control the speed of the latter. The change in the angle of attack is effected by rotating the guide vanes around their axes by means of a guide vane operating mechanism.

The guide vane operating mechanism has a guide ring of an outside diameter smaller than the inside diameter of the volute casing, a plurality of linking mechanisms through which the guide vanes are connected to the guide ring, and a servomotor for rotatably driving the guide ring.

A typical conventional guide vane operating mechanism is illustrated in FIGS. 1a and 1b. More particularly, in a hydraulic power generating plant, the Francis turbine has a runner 18 integral with a main shaft 19, with the runner 18 being adapted to be rotated by the energy of the water introduced from the volute casing 16 through the guide vanes 1. A water seal 20 is provided for packing the main shaft 19, along with a metal case 21, an upper cover 22, and a floor 23 of an access passage which is fixed to a pit liner 14 so as to cover a guide ring 6 described more fully hereinbelow.

Each guide vane 1 is mounted by upper and lower shafts 2 and 2a for rotation around the common axis of these shafts, with a lever 3 being fixed to the upper shaft 2 constituting an operation shaft for the guide vane 1. The lever 3 is pivotally connected one end to one end thereof of a link 5 through a pin 4. The other end of the link 5 is pivotally connected through a pin 7 to the lower annular flange 6a of the guide ring 6 surrounding the main shaft 19, with the guide ring 6 being adapted to slide along a guide rail 61.

In operation, as the guide ring 6 is rotated around the main shaft 19, the guide vanes 1 are rotated around the axes of the shafts 2, 2a through the action of the levers 3 and the links 5. Thus, the orientation of the guide vanes 1, i.e. the angle of attack at which the water comes into collision with the blades of the runner 18, is determined in accordance with the rotational position of the guide ring 6.

As shown in FIG. 1b, a servomotor device includes a link 8 having a forked end which is pivotally connected through a pin 9 to an upper annular flange 6c of the guide ring 6 in such a manner that the flange 6c is sandwiched between both fingers of the forked end. The other end of the link 8 which is also forked is pivotally connected through a pin 10 to a fitting 11 fitted onto the end of the piston rod 12 of a servomotor 13. The servomotor 13 is fixed at its rear end by bolts 13a and nuts 13b to a fixing member 15a laid on the concrete wall 15a along the pit liner 14.

In operation, as the servomotor 13 is actuated to extend or retract the piston rod 12, the guide ring 6 is rotated through the action of the fitting 11, pin 10, link 8 and the pin 9, to thereby cause the rotation of the guide vanes 1 as described above.

In order for the servomotor 13 to safely operate, it is essential to avoid, when the piston rod 12 is moved in the direction of the arrow, any interference between the outer extremity of the fitting 11 shown by the broken line and the upper flange 6c of the guide ring 6. To this end, it is necessary to preserve a large distance between the pins 9 and 10 on the link 8, which causes the link 8 to have a large length. This requires a backward shifting of the position of the installation of the servomotor 13. Unfortunately, however, it is not possible to shift the servomotor 13 unlimitedly because of the interference of the servomotor, with the volute casing 16. In order to avoid the interference between the servomotor 13 and the volute casing 16, it is necessary to mount the servomotor at an elevated position above the upper surface of the casing 16 as shown in FIG. 1c, which, in turn, requires the guide ring 6 to have a correspondingly elevated height. For this reason, in the conventional guide vane operating mechanism, the length of the link 8 is inevitably increased so as to result in various problems such as an increase in the pit space 17 in which the servomotor 13 is situated, an increase in the height and size of the guide ring 6, and so forth.

This problem would be overcome if the link 8 is omitted, i.e. if the fitting 11 is directly connected to the guide ring 6 by means of the pin 9. Such an arrangement, however, results in another problem in that the piston rod 12 becomes inoperative due to a twisting force applied thereto because the pins 9 are moved along arcuate paths but not linear paths as the guide ring 6 rotates, unless a complicated construction such as a rockable mount for the servomotor 13 is provided.

The increased height of the guide ring 6 imposes another problem in that, since the guide ring 6 having such a large height conceals the main shaft 19, it becomes quite difficult to effect the maintenance work around the main shaft 19 such as renewal of the water seal packing 20 on the main shaft 19.

Accordingly, an object of the invention is to reduce the dimensions of the guide vane operating mechanism by decreasing the area of the pit for installing the servomotor and reducing the height of the guide ring.

To this end, according to one aspect of the invention, there is provided a guide vane operating mechanism for a hydraulic machine having a main shaft carrying a runner, and guide vanes for varying the angle of attack of the water to the runner, comprising: a guide ring rotatably arranged around the main shaft; a guide vane driving mechanism for linkage between said guide vanes and said guide ring to drive said guide vanes between fully-open and fully-closed positions; at least one servomotor having a reciprocatingly actuating rod; and a guide ring actuating mechanism for transmitting the drive power to the guide ring so as to cause a rotation of the latter; wherein the guide ring actuating mechanism includes connecting means for connecting the actuating rod to the guide ring so as to permit the actuating rod and the guide ring to make a cranking motion relative to each other.

According to the invention, the connecting means permitting the actuating rod and the guide ring to make a cranking motion relative to each other comprises a crankshaft composed of two cylindrical columns integrally connected to each other at an eccentricity from each other.

In the guide vane operating mechanism of the invention, since the end of the actuating rod of the servomotor is connected to the guide ring through the crankshaft, it is possible to eliminate the elongated link which is indispensable in the conventional guide vane operating mechanism. Consequently, the servomotor can be mounted substantially at the same level as the guide ring without interference with the casing. Thus, the guide vane operating mechanism can be mounted in a compact manner within the inner periphery of the casing. In addition, the guide ring does not impede the maintenance work around the main shaft because it is not necessary to provide a high peripheral wall.

The invention will be fully described hereinunder through its preferred form with reference to the accompanying drawings in which:

FIG. 1b is a schematic top plan view of a servomotor device incorporated in the guide vane operating mechanism shown in FIG. 1a;

FIG. 2a is a sectional view of a guide vane operating mechanism in accordance with an embodiment of the invention provided on an upper portion of a water turbine;

FIG. 2b is a top plan view of the guide vane operating mechanism shown in FIG. 2a;

FIG. 2c is a side elevational view of a servomotor device incorporated in the guide vane operating mechanism shown in FIG. 2a;

FIG. 5 is an enlarged vertical sectional view of the guide vane operating mechanism shown in FIG. 2a;

Figure 3:
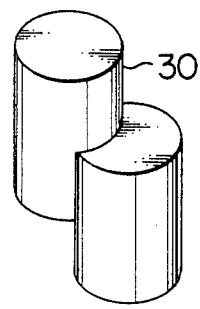
FIGS. 3 and 4 are perspective views of examples of a crankshaft incorporated in the embodiment shown in FIGS. 2a to 2c.
Figure 4:
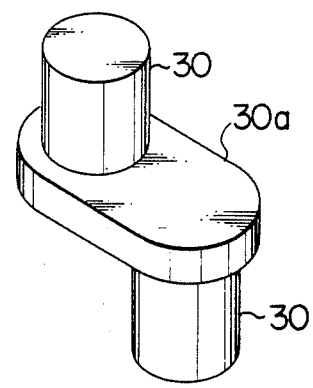
Figure 5:
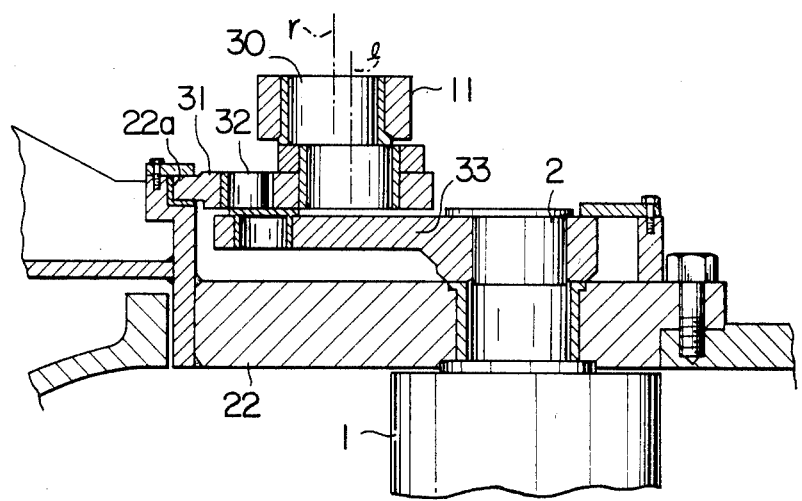
Figure 6:
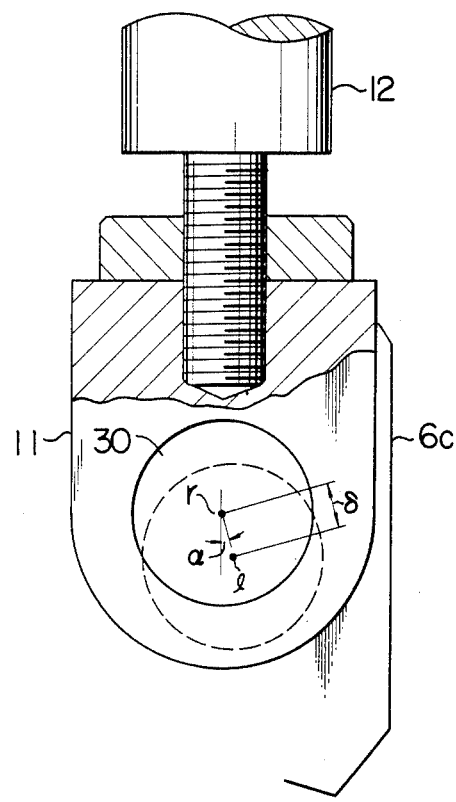
FIG. 6 is a top plan view of a fitting connection adopted in the mechanism shown in FIG. 5.

Referring now to the drawings wherein like reference numerals are used throughout the various views to designate like parts and, more particularly, to FIGS. 2a-6, according to these figures, a guide vane operating mechanism of the invention has a crankshaft 30 composed of two cylindrical columns integrally connected to each other with their axes r and l disposed at an eccentricity from each other. One end of the crankshaft 30 is rotatably received by the fitting 11 on the piston rod 12, while the other end of the same is rotatably received by the guide ring 31. The guide ring 31 has an annular disc-link form with its inner peripheral edge guided by the step of an inner cylinder 22a of the upper cover 22. An eccentric pin 32 is composed of a pair of cylindrical columns integral with each other with their axes disposed at an eccentricity from each other as in the case of the crankshaft 30. The eccentric pin 32 is rotatably received at its one end by a guide ring 31 while the other end thereof rotatably fits in a bore formed in one end of each of a plurality of levers 33. More specifically, the levers 33, which corresponds in number to the number of the guide vanes 1, are arranged at a constant circumferential pitch on the outer periphery of the guide ring 31, and the other ends of the levers 33 are connected to the upper operation shafts 2 of the corresponding guide vanes 1. As shown in FIGS. 3 and 4, the two cylindrical columns constituting the crankshaft 30 may be connected directly to each other or may be connected indirectly to each other through a crank web portion 30a having a width greater than the outside diameter of the columns. By providing the intermediate crank web portion 30a, it is possible to obtain a greater amount of eccentricity between two cylindrical columns. The angle $\alpha$ (see FIG. 6) formed between the line of movement of the fitting 11 and the line interconnecting the centers of the cylindrical columns of the crankshaft 30 is selected to range between 0° and 45°. The efficiency of transmission of force from the piston rod 12 to the fitting 11 is decreased as this angle $\alpha$ grows large. As will be seen from FIGS. 2b and 2c, since the link essential in the conventional arrangement is eliminated, the installation of the servomotor 13 requires only a small space 17a slightly projecting from the pit liner 14, and the interference between the servomotor 13 and the casing 16 is advantageously avoided.

Figure 7:
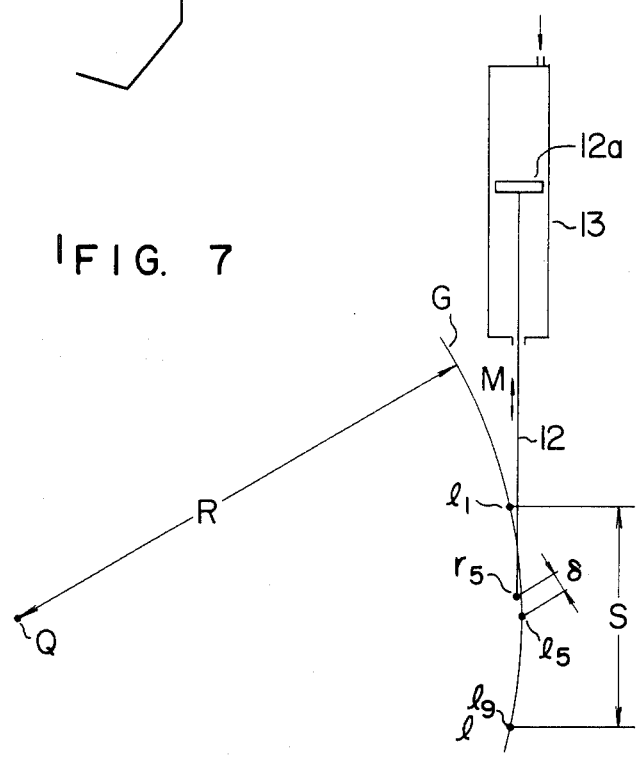
FIG. 7 is an illustration of path of movement of the crankshaft incorporated in the guide vane operating mechanism of the invention.
Figure 8:
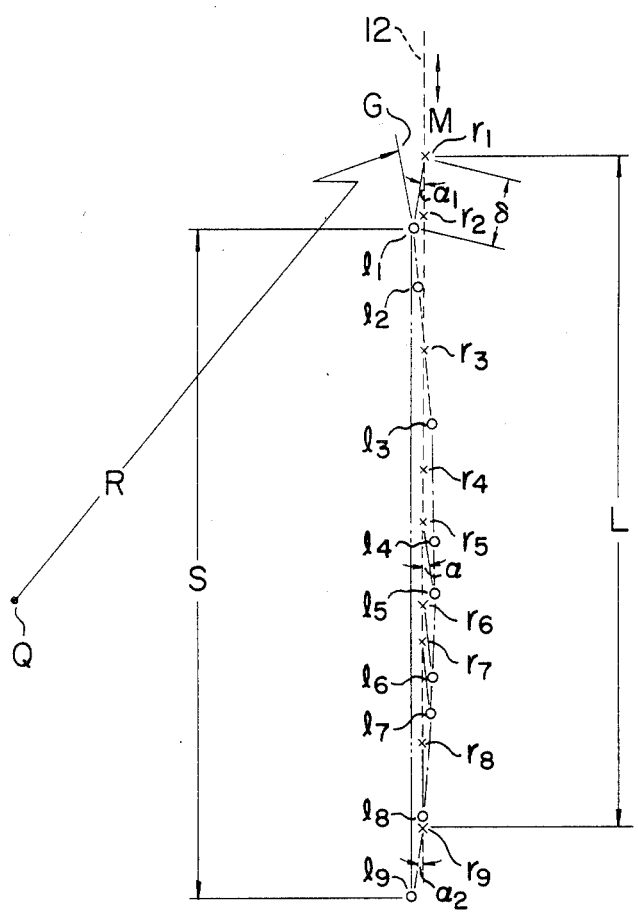
FIG. 8 is an enlarged and analytical illustration of the path of movement of the crankshaft as shown in FIG. 7.

Referring now to FIGS. 7 and 8, a reference symbol Q represents the center of the guide ring, while R represents the radius of the arcuate path G of movement of the portion of the crankshaft 30 received by the guide ring 31 as measured from the center Q of the guide ring 31. An arc $l_1$–$l_9$ is the locus of movement of the axis 1 of the portion of the crankshaft 30 received by the guide ring 31 during the operation of the guide vanes between the full-open position and the full-close position. A symbol S represents the distance travelled by this portion of the crankshaft 30 when the same is moved from the point $l_1$ to the point $l_9$. A line $r_1$–$r_9$ is the linear locus drawn by the axis r of the portion of the crankshaft 30 received by the fitting 11. A symbol L represents the distance travelled by this portion of the crankshaft 30 when the same is moved from the point $r_1$ to the point $r_9$. The distances S and L, which are the same, are equal to the distance of movement of the piston rod 12, i.e. the distance of movement of the fitting 11. The points $r_5$ and $l_5$ correspond to the half opening of the guide vanes 1. A symbol $\delta$ represents the distance or eccentricity between the axes of two cylindrical columns of the crankshaft 30.

Assuming that the guide vanes 1 are to be operated from the fully-open position to the fully-closed position, the operation of the guide vane operating mechanism is as follows. Assuming that the positions $r_1$ and $l_1$ of respective portions of the crankshaft 30 correspond to the fully-open position of the guide vanes 1, as the piston rod 12 is activated, the guide ring 31 is rotated around the center Q thereof along the arcuate path G of the radius R. Consequently, the axes r and l of respective portions of the crankshaft 30 are started from the positions $r_1$, $l_1$ and are moved past the positions $r_2$, $l_2$; $r_3$, $l_3$ and $r_4$, $l_4$ to reach the positions $r_5$, $l_5$ corresponding to the half opening of the guide vanes. Then, as the piston rod 12 is further activated, the axes of the crankshaft 30 are moved past the positions $r_6$, $l_6$; $r_7$, $l_7$ and $r_8$, $l_8$ to reach the positions $r_9$, $l_9$ corresponding to the full-closing of the guide vanes.

As shown in FIG. 7, the axis of the position of the crankshaft represented by r makes a linear movement despite the rotation of the crankshaft 30. On the other hand, the portion of the crankshaft represented by l moves along the arcuate path G. More specifically, the points $l_1$, $l_2$ and $l_9$ are located at the left side of the axis r of the crankshaft 30 making a linear movement, while the points $l_3$ to $l_7$ are located at the right side of the same, thereby to smooth the linear motion of the piston rod 12.

For operating the guide vanes to the fully open position, the piston rod 12 is reversed so that the axes r and l of the crankshaft 30 are moved from the positions $r_9$, $l_9$ to the positions $r_1$, $l_1$, respectively.

According to the invention, it is possible to eliminate the link which is used for actuating the guide ring in the conventional guide vane operating mechanism. Consequently, the area of the pit portion 17a for the installation of the servomotor 13 is decreased and the dimensions of the guide ring 31 can be decreased remarkably, so that the dimensions of the guide vane operating mechanism can be advantageously reduced.

Although the invention has been described through specific terms, it is to be understood that the described embodiment is not exclusive and various changes and modifications may be imparted thereto.

Figure 1A:
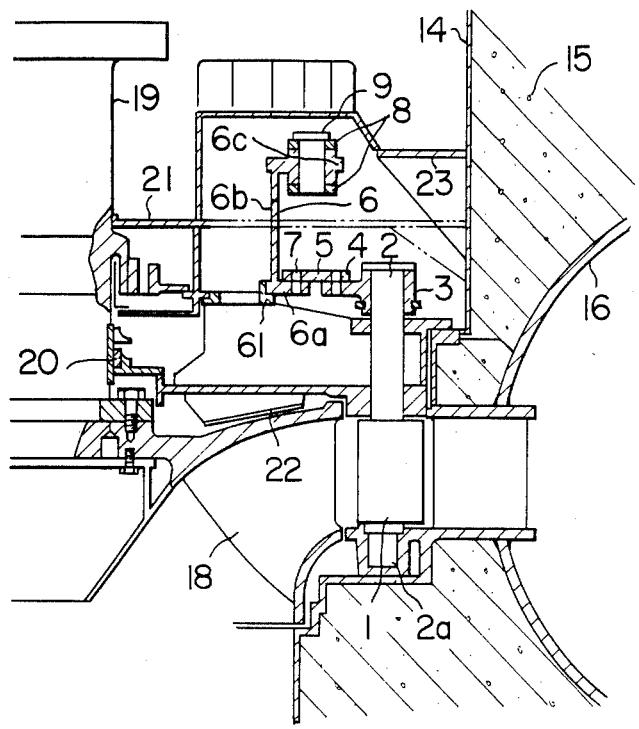
FIG. 1a is a sectional view of a conventional guide vane operating mechanism provided in an upper portion of a Francis turbine used in a hydraulic power generating plant.
Figure 1C:
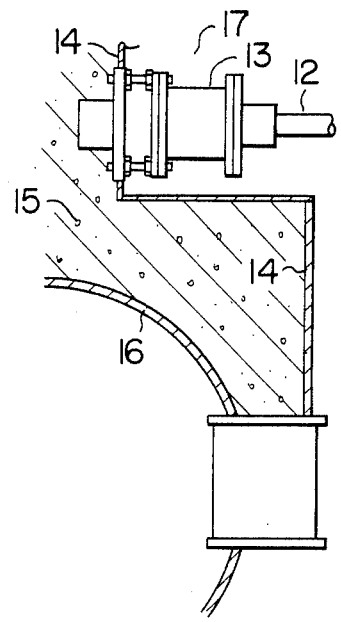
FIG. 1c is a side elevational view of a servomotor device incorporated in the guide vane operating mechanism shown in FIG. 1c.
Figure 1B:
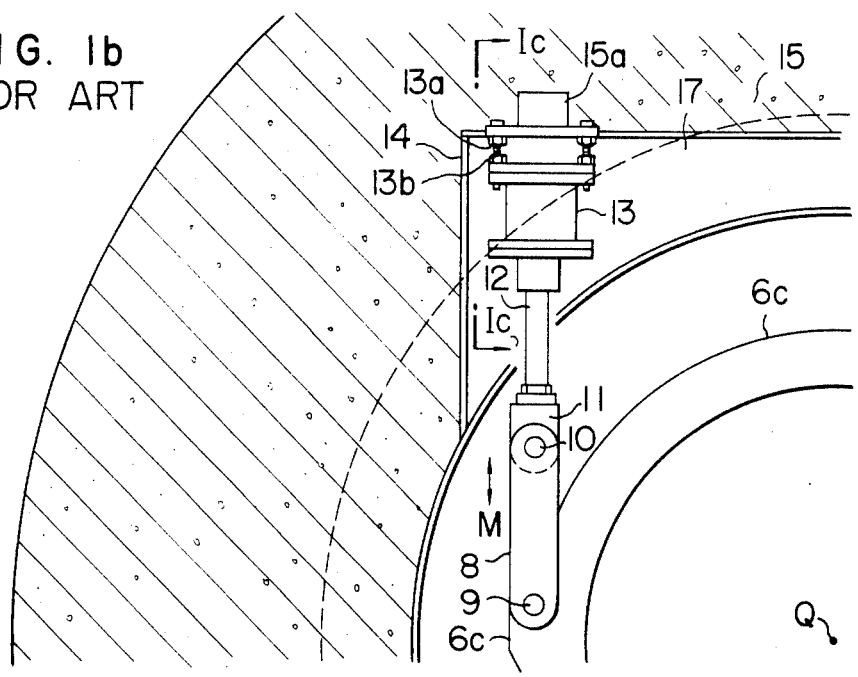

For instance, although in the described embodiment the eccentric pin 32 is used for pivotally connecting the lever 33 to the guide ring 31, this may be substituted by a link of the same type as the link 5 used in the conventional arrangement shown in FIG. 1a.

Other changes and modifications are still possible without departing from the scope of the invention which is limited solely by the appended claims.

What is claimed is:

1. A guide vane operating mechanism in a hydraulic machine having a main shaft; a volute casing surrounding said main shaft and having an inner peripheral wall, said volute casing being imbedded in a concrete structure having an inner wall defining an inside space; a runner integrally incorporated with said main shaft and disposed within said inside space; and guide vanes lying along said inner peripheral wall of said volute casing for guiding water led from said volute casing to said runner at an optimum angle for rotation of said inner runner; the guide vane operating mechanism comprising: a plate-like rotatable guide ring rotatably arranged around said main shaft within said inner space and having an outer peripheral edge section defining therein a bearing hole; a guide vane driving mechanism for linkage between said guide vanes and said guide ring to drive said guide vanes in a range of between fully-opened and fully-closed positions in association with rotation of said guide ring; at least one servo motor having a gear end stationarily secured to said inner wall of said concrete structure and having a reciprocating piston rod secured thereto with a rod end fitting formed therein with a bearing hole, for rotating said guide ring, said piston rod reciprocating slightly above said guide ring in a direction parallel to a line tangential to said outer peripheral edge section of said guide ring; and an eccentric pin formed of two columnar bodies which are integrally incorporated together in a staggered manner so that one of said columnar bodies provides one end shaft part of said eccentric pin while the other of said columnar bodies provides the other end shaft part of said eccentric pin for connecting said rod end fitting with said guide ring such that said one end shaft part of said eccentric pin is rotatably fitted in said bearing hole in said rod end fitting while the other end shaft part of said eccentric pin is rotatably fitted in said bearing hole in said outer peripheral edge section of said guide ring.

* * * * *